United States Patent
Diehl et al.

[11] 3,923,285
[45] Dec. 2, 1975

[54] STEM CONNECTION FOR GATE VALVES

[75] Inventors: Robert J. Diehl; Larry E. Guthrie, both of Houston, Tex.

[73] Assignee: ACF Industries, Incorporated, New York, N.Y.

[22] Filed: Sept. 19, 1974

[21] Appl. No.: 507,313

[52] U.S. Cl. .............. 251/200; 403/341; 251/326; 251/327
[51] Int. Cl.² ..................... F16K 3/314; F16D 1/02
[58] Field of Search.................... 251/327, 326, 200; 403/341, 310

[56] References Cited
UNITED STATES PATENTS
| | | |
|---|---|---|
| 3,091,823 | 6/1963 | Murton ........................ 403/341 X |
| 3,534,764 | 10/1970 | Natho et al. .................. 251/200 X |

FOREIGN PATENTS OR APPLICATIONS
| | | |
|---|---|---|
| 3,628 | 7/1883 | United Kingdom.............. 403/341 |
| 12,202 | 7/1891 | United Kingdom.............. 403/341 |

Primary Examiner—Arnold Rosenthal
Attorney, Agent, or Firm—E. N. Riddle

[57] ABSTRACT

A connector for connecting a gate valve stem to a gate element includes a pair of split connector sections which fit over adjacent enlarged end portions of the gate element and stem. The connector sections receive the enlarged end portions in a cavity and a cap fits over the split sections to hold the sections about the enlarged end portions of the gate element and stem. The cap and split sections are rapidly disassembled and reassembled about the enlarged end portions.

6 Claims, 3 Drawing Figures

STEM CONNECTION FOR GATE VALVES

BACKGROUND OF THE INVENTION

Oftentimes it is necessary to repair a gate valve structure while the valve structure is in an operable position and under pressure. Line pressures under which gate valves may be operating may be as high as around 20,000 psi, for example, and it is highly desirable that a workman not be exposed to such pressure for any longer than absolutely necessary. Heretofore, it has been common to have a threaded nut for connecting a valve stem to a gate member. The use of a threaded nut requires a considerable amount of time for disconnecting and then reconnecting the valve stem to a gate member thereby exposing a repairman to high pressure fluids for a substantial period of time. For example, U.S. Pat. No. 3,463,446 issued Aug. 26, 1969 shows a cylindrical collar or nut which is threaded onto the gate member and thereby connects an operating stem to the gate member for reciprocation of the gate member between open and closed positions. The nut or collar forms a connector which is effective for connecting the stem to the gate element, but must be threaded onto the gate element extension when connecting the stem and must be unthreaded when the gate element is disconnected. The threading and unthreading of the collar, such as may be necessary for replacement of a valve stem, requires a substantial amount of time.

DESCRIPTION OF THE INVENTION

The present connector for connecting an operating stem to a gate element does not employ threads in any manner and permits the connector to be easily positioned about adjacent enlarged end portions on the stem and valve element for simple and fast assembly and disassembly. When a gate valve is repaired under pressure, rapid removal of the bonnet and stem is highly desirable so that a workman or the like is possibly exposed only for a minimum of time to the hazards of a high pressure flow passage. The invention includes a pair of split connector sections which fit about adjacent enlarged diameter end portions on the operating stem and the gate element with each split connector section having inner and outer semicircular grooves or openings receiving the stem and extension on the adjacent end of the valve element. An enlarged intermediate cavity is provided in each of the connector sections between the inner and outer semicircular openings and receives the enlarged end portions of the stem and extension. To hold the split sections together when they have been positioned over the enlarged end portions, an open ended generally cylindrical cap having an opening in its closed end receiving the stem fits over the split sections and is secured thereto for maintaining the split sections in proper position about the enlarged end portions of the operating stem and valve element.

The present invention is especially designed to minimize stress concentrations or binding since no threaded connections are provided between the operating stem and the valve element. Further, a key on the end of the operating stem fits in a slot in the extension for the gate element and limited relative movement is provided between the operating stem and extension for the gate element to minimize any stress concentrations. Upon opening of the valve, the forces are transmitted from the operating stem and gate element to the split connector sections and particularly to the abutments formed within the connector sections. The split connector sections are designed so that the abutments are subjected to the tensile forces during movement of the gate element to an open position. During movement of the gate element to closed position, the connector sections are not subjected to tensile forces as the abutting end surfaces of the enlarged end portions on the operating stem and the valve element act under compressive forces.

A preferred embodiment of the invention has been chosen for the purpose of illustration and description and is shown in the accompanying drawings, forming a part of this specification wherein.

Figure 1:
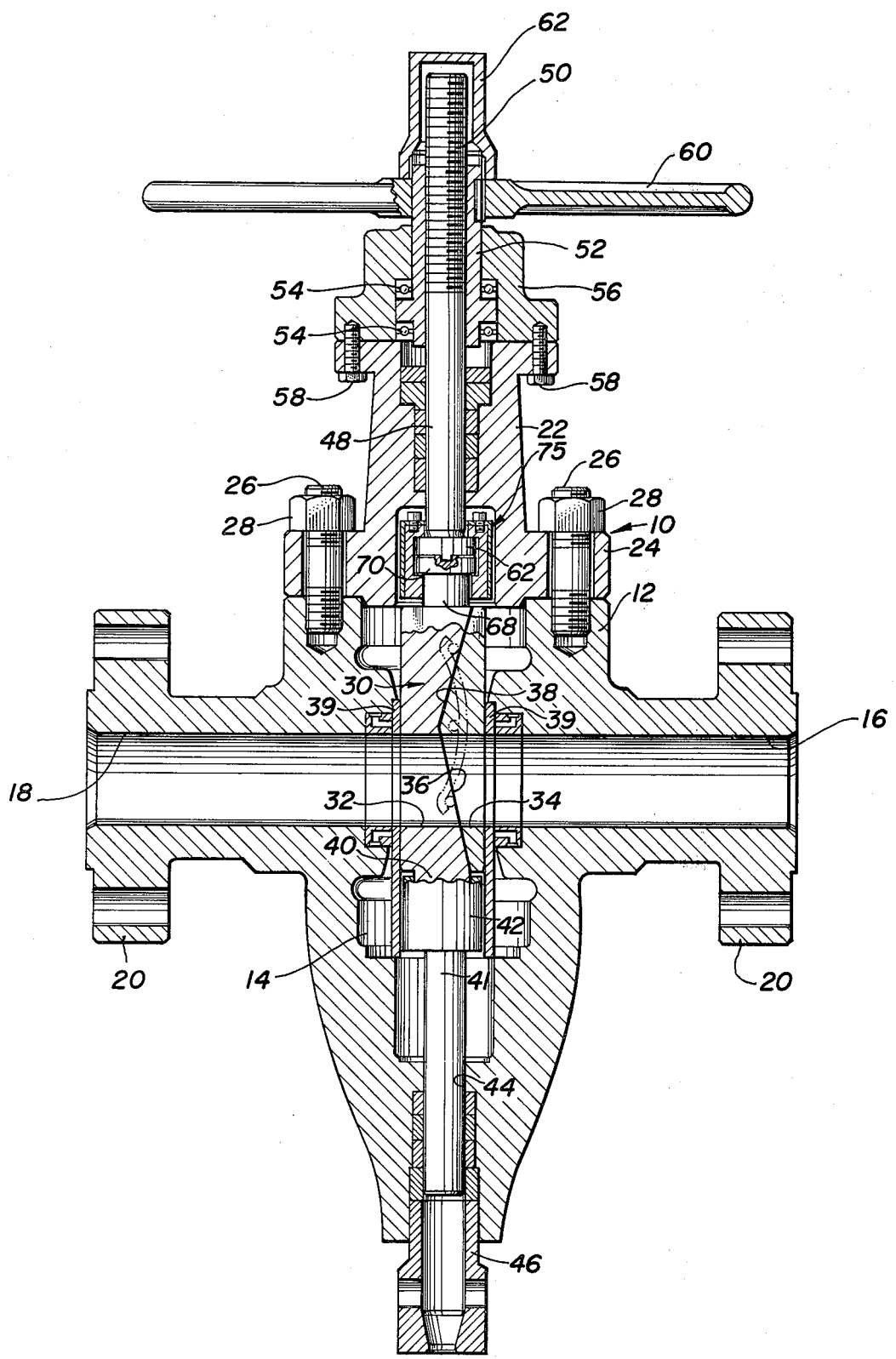
FIG. 1 is a sectional view of a gate valve structure embodying the present invention.
Figures 2, 3:
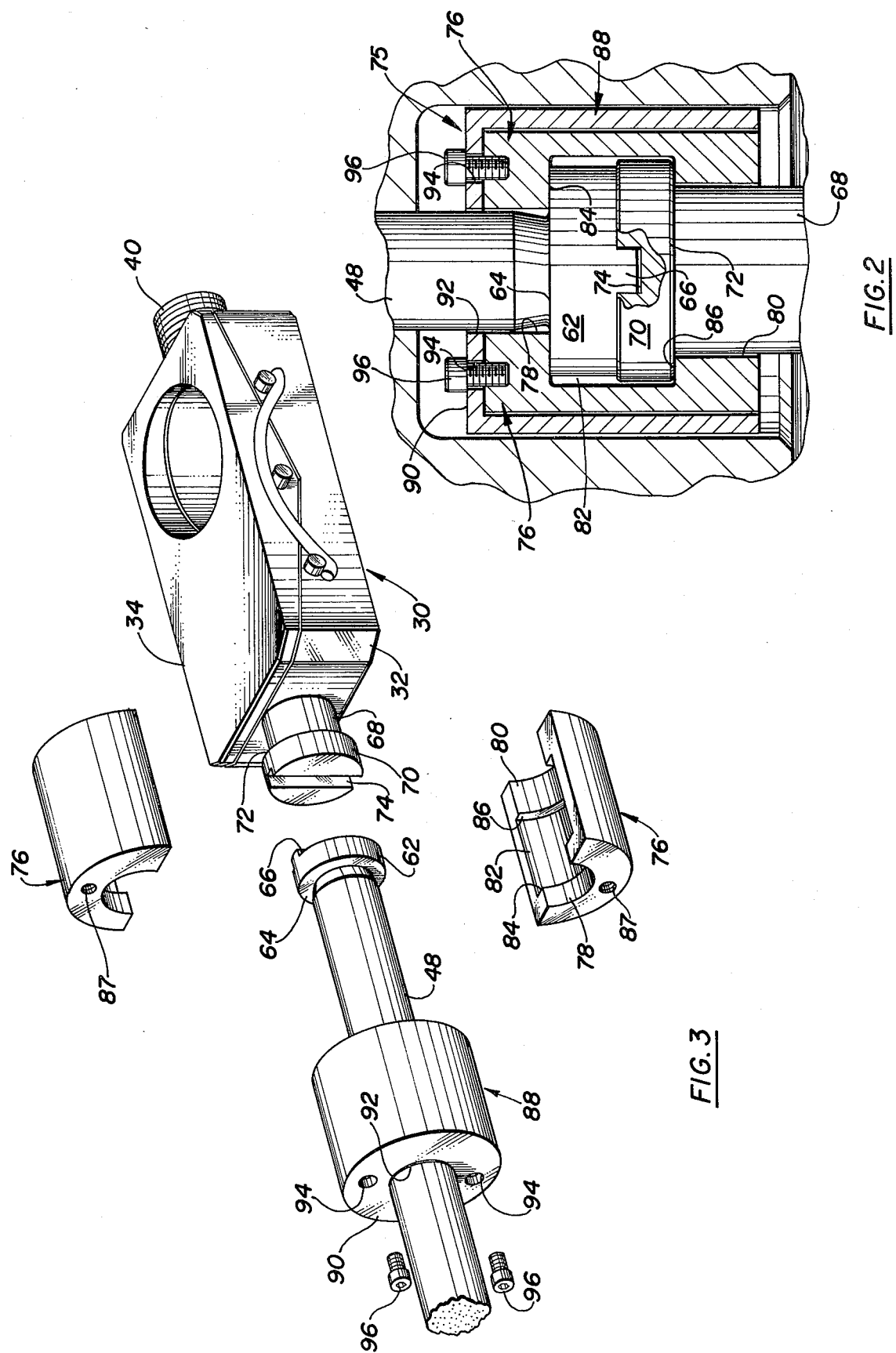
FIG. 2 is an enlarged fragment of FIG. 1 showing the connector forming the present invention.
FIG. 3 is an exploded view of the connector for the operating stem and gate element shown in FIGS. 1 and 2.

Referring now more particularly to the drawings for a better understanding of this invention and more particularly to FIG. 1, a gate valve structure generally indicated 10 includes a valve body generally indicated 12 having a valve chamber 14 therein. An inlet fluid passage 16 and an outlet flow passage 18 communicate with valve chamber 14. Flanges 20 on the ends of valve body 12 may be suitably connected to a pipeline or other flow system as is well known in the art. A bonnet 22 has a lower flange 24 which is secured by studs 26 and nuts 28 to the upper end of body 12.

A gate valve assembly generally indicated 30 is mounted within chamber 14 for movement between open and closed positions relative to flow passages 16 and 18. Gate assembly 30 includes a gate element 32 and a complementary segment 34. Gate element 32 has a back face 36 which receives a convex back face 38 of segment 34. Seat assembly 30 is of the expanding type in which element 32 and segment 34 expand away from each other in the fully open and closed positions of seat assembly 30 thereby to provide a fluid tight seal with seat elements 39.

Gate valve structure 10 is of the so-called balanced stem type which is normally employed for relatively high pressures, such as 10,000 psi to 20,000 psi, for example. Mounted adjacent an extension 40 on the lower end of gate assembly 30 is a pilot or balancing stem 41 secured to extension 40 by a nut 42 threaded on extension 40. Balancing stem 41 is received within an opening 44 and a lower sleeve 46 is telescoped within opening 44.

An operating stem 48 has an upper threaded portion 50. An internally threaded drive sleeve 52 is supported for rotary movement relative to bonnet 22 by thrust bearings 54 mounted within a bearing housing 56. Bearing housing 56 is secured by bearing studs 58 to bonnet 22. A handwheel 60 is disposed at the upper end of drive sleeve 52 and is retained thereon by stem cover 62. Stems 42 and 48 are of substantially the same cross-sectional area so that there remains in chamber 14 at all times the same proportional amount of stem which results in a generally hydraulically balanced valve assembly. Fluid pressure in chamber 14 above and below gate assembly 30 is therefore equalized and the gate assembly is balanced.

Stem 48 has an enlarged end portion 62 forming an outer peripheral surface 64 and having a key 66 projecting from its inner surface. Gate element 32 has an extension 68 thereon terminating in an enlarged end portion 70 forming an inner peripheral surface 72. Enlarged end portion 70 has an elongated slot 74 therein adapted to receive key 66 and being of a size slightly larger than key 66 to permit a limited relative movement between key 66 and slot 74 thereby to minimize any stress concentrations.

A connector structure generally indicated 75 for connecting stem 48 and gate element 32 includes a pair of split retainer sections each generally designated 76 which when positioned about enlarged portions 62 and 70 form a generally cylindrical shape. Each split connector section 76 comprises an outer semicircular groove or opening 78 and an inner semicircular opening or groove 80. An intermediate cavity 82 is formed between semicircular openings 78 and 80 and an abutment 84 is formed between cavity 82 and opening 78. Abutment 86 is formed between cavity 82 and groove 80. Each section 76 has a threaded opening 87 therein. When connector sections 76 are positioned about enlarged end portions 62 and 70, abutment 84 is in contact with peripheral surface 64 and abutment 86 is in contact with peripheral surface 72. In this position key 66 fits within groove 74 and end portions 62 and 70 are positioned within cavity 82. To hold connector sections 76 together about end portions 62 and 70 an open ended cover or cap 88 has a closed end 90 with an opening 92 receiving stem 48. Cap 88 has a pair of opposed openings 94 therein which may be aligned with threaded openings 87 in connector sections 76. Upon axial alignment of openings 94 with threaded openings 87, studs 96 may be threaded within openings 87 thereby to hold cover 88 in position about connector sections 76.

In the event it is desired to replace stem 48, for example, with valve 10 in a pipeline under pressure, gate assembly 30 is moved to a closed position and then studs 58 are removed to permit removal of handwheel 60 and bearing housing 56. Next, bonnet 22 may be removed by removal of nuts 28 from studs 26. In this position, access to the stem connector is obtained and studs 96 are then removed. Outward movement of cap 88 then permits sections 76 to be withdrawn permitting removal of stem 48. Upon insertion of a new stem 48 with key 66 fitting in slot 74, connector sections 76 are positioned about enlarged end portions 62 and 70. Then, cap 88 is positioned over connector sections 76 and studs 94 are then inserted. Next, bonnet 22 may be added by securing of nuts 28 onto studs 26 and then bearing housing 56 may be secured by studs 58 to complete the assembly of gate valve structure 10. In this position, gate assembly 30 may be moved to its open position.

It is to be understood that tensile forces upon the movement of gate assembly 30 to an open position are transmitted through peripheral portions 64 and 72 of respective enlarged end portions 62 and 70 to abutments 84 and 86. Cap 88 does not receive any such tensile forces and only serves to maintain connector sections 76 in position about enlarged end portions 62 and 70. Upon movement of gate assembly 30 to closed position from an open position, compressive forces are transmitted between contacting enlarged end portions 62 and 70 and such forces are not transmitted to the connector sections 76.

What is claimed is:

1. A gate valve structure comprising a valve body having a valve chamber therein and inlet and outlet flow passages communicating with the valve chamber, a gate valve mounted within the valve chamber for movement between open and closed positions and having a flow passage therein for alignment with said inlet and outlet flow passages, an extension on an end of said gate valve having an enlarged diameter end portion, an operating stem adjacent said extension having an enlarged diameter end portion in contiguous relation to said enlarged diameter end portion on the gate valve, a pair of split connector sections fitting about said enlarged diameter end portions, each split section having inner and outer semicircular openings receiving the respective stem and extension and an enlarged intermediate cavity between the inner and outer openings receiving the enlarged end portions, said connector sections when positioned over said enlarged end portions being of a generally cylindrical shape, an open ended cap fitting over the connector sections to hold the connector sections in position about the enlarged end sections of said stem and extension, and means to secure the cap over the connector sections.

2. A gate valve structure as set forth in claim 1 wherein said gate valve comprises an expanding gate assembly including a gate element and segment slidably mounted within the valve structure for movement between open and closed positions of the gate.

3. A gate valve structure as set forth in claim 1 wherein said gate valve structure includes a second extension adjacent the other end of said gate valve and a pilot stem adjacent the second extension with the pilot and operating stems having substantially the same area of displacement in the valve chamber, and means securing the pilot stem to the second extension.

4. A gate valve structure as set forth in claim 1 wherein each connector section has a pair of spaced abutments adjacent opposed ends of said intermediate cavity engaging a peripheral surface of an associated enlarged end portion and upon an outward movement of the operating stem tensile forces are transmitted from said enlarged end portions to said abutments.

5. A gate valve structure comprising a valve body having a valve chamber therein and inlet and outlet flow passages communicating with the valve chamber, a gate element mounted within the valve chamber for movement between open and closed positions and having a flow passage therein for alignment with said inlet and outlet flow passages, an extension on an end of said gate element having an enlarged diameter end portion, an operating stem adjacent said extension having an enlarged diameter end portion in contiguous relation to said enlarged diameter end portion on the gate element, a pair of split connector sections fitting about said enlarged diameter end portions, each split section having inner and outer semicircular openings receiving the respective stem and extension and an enlarged intermediate cavity between the inner and outer grooves receiving the enlarged end portions, said enlarged intermediate cavity defined by a pair of spaced end abutments adjacent the semicircular openings and said enlarged end portions having peripheral surfaces engaging said abutments so that upon an outward movement of the operating stem tensile forces are transmitted from the enlarged end portions to said abutments, said connector sections when positioned over said enlarged end portions being of a generally cylindrical shape, an open ended cap fitting over said outer ends of said split sections when positioned over said enlarged end portions, and means to secure the retainer sections to the cap thereby to hold the sections together.

6. A gate valve structure as set forth in claim 5 wherein said enlarged end portion on said extension has a longitudinal slot in its outer face, and said enlarged end portion on said stem has a projecting key fitting within said slot.

* * * * *